United States Patent [19]
Ito

[11] Patent Number: 4,654,582
[45] Date of Patent: Mar. 31, 1987

[54] TRANSIENT TEST OF SUSPENSION ELECTRONICS FOR GYROSCOPE

[75] Inventor: Paul H. Ito, Los Angeles, Calif.

[73] Assignee: The United States of America as represented by the Secretary of the Air Force, Washington, D.C.

[21] Appl. No.: 752,767

[22] Filed: Jul. 8, 1985

[51] Int. Cl.⁴ ............................................. G05B 23/02
[52] U.S. Cl. ..................................... 324/73 R; 33/322; 73/178 R; 244/194; 340/825.16; 340/963; 371/68
[58] Field of Search .................. 73/504, 505, 517 AV, 73/517 B, 178 R; 74/5.6 D, 5 R, 5.34, 5.6 R, 5.6 E; 244/165, 171, 79, 194; 324/158 R; 340/669, 670, 825.16, 945, 963, 967, 971, 974, 975, 976; 364/424, 434, 443, 453, 551, 559, 184–186; 33/321, 322; 371/18, 68

[56] References Cited

U.S. PATENT DOCUMENTS

| | | | |
|---|---|---|---|
| 3,323,378 | 6/1967 | Powell | 74/5.6 |
| 3,334,949 | 8/1967 | Atkinson | 308/10 |
| 3,338,644 | 8/1967 | Atkinson et al. | 308/10 |
| 3,401,549 | 9/1968 | Miller | 73/178 R |
| 3,403,874 | 10/1968 | Boskovich et al. | 371/36 X |
| 3,463,909 | 8/1969 | Weiss | 364/559 |
| 3,482,455 | 12/1969 | Boltinghouse et al. | 74/5.6 |
| 3,603,948 | 9/1971 | Medlinski | 371/68 X |
| 3,642,334 | 2/1972 | Atkinson | 308/10 |
| 3,657,918 | 4/1972 | Hurlbert | 73/1 D |
| 3,697,143 | 10/1972 | Klinchuch | 308/10 |
| 3,807,238 | 4/1974 | Chombard | 74/5.7 |
| 3,882,406 | 5/1975 | Graves et al. | 371/68 X |
| 3,891,285 | 6/1975 | Atkinson | 308/10 |
| 3,955,426 | 5/1976 | Klinchuch | 74/5.6 D |
| 4,155,116 | 5/1979 | Tawfik et al. | 364/424 X |
| 4,255,978 | 3/1981 | Shima et al. | 73/577 |
| 4,327,437 | 4/1982 | Gelderloos | 371/68 |

OTHER PUBLICATIONS

Rockwell International, "Electrostatic Gyro Operation and Application", presentation at the 34th Annual Meeting of the Institute of Navigation, 26–29, Jun. 1978, Arlington, Va.

Primary Examiner—Gerard R. Strecker
Assistant Examiner—Stephen M. Baker
Attorney, Agent, or Firm—Bernard E. Franz; Donald J. Singer

[57] ABSTRACT

The rotor suspension electronics of an electrostatic gyro suspension system is required to perform flawlessly to sustain the life of the gyro. Transient abnormalities as short as one millisecond duration will cause the spinning rotor to come in contact with the surrounding electrodes and result in destruction of the gyro. Thus, not infrequently after a catastrophic dropped rotor incident no trace of the fault is evident upon ensuing check of the system. To remedy this problem a built in test (BIT) system is used to provide fault isolation. The test circuitry is built into the navigation system electronics and integrated with the system program. The fault isolation electronics comprise sensor circuits to monitor functional subdivisions of the electronic suspension system for signal abnormality and a processing circuit which receives the sensor circuit outputs and identifies the primary source of the fault. The faults are detected and the source is flagged at the time of occurance. The output of the fault isolation electronics is a latched coded readout which is fed to the nagivation computer for memory storage and any appropriate follow-up system action, such as power shutdown. After initialization by the computer, the fault isolation function is an automatic operation by the electronic circuitry.

14 Claims, 12 Drawing Figures

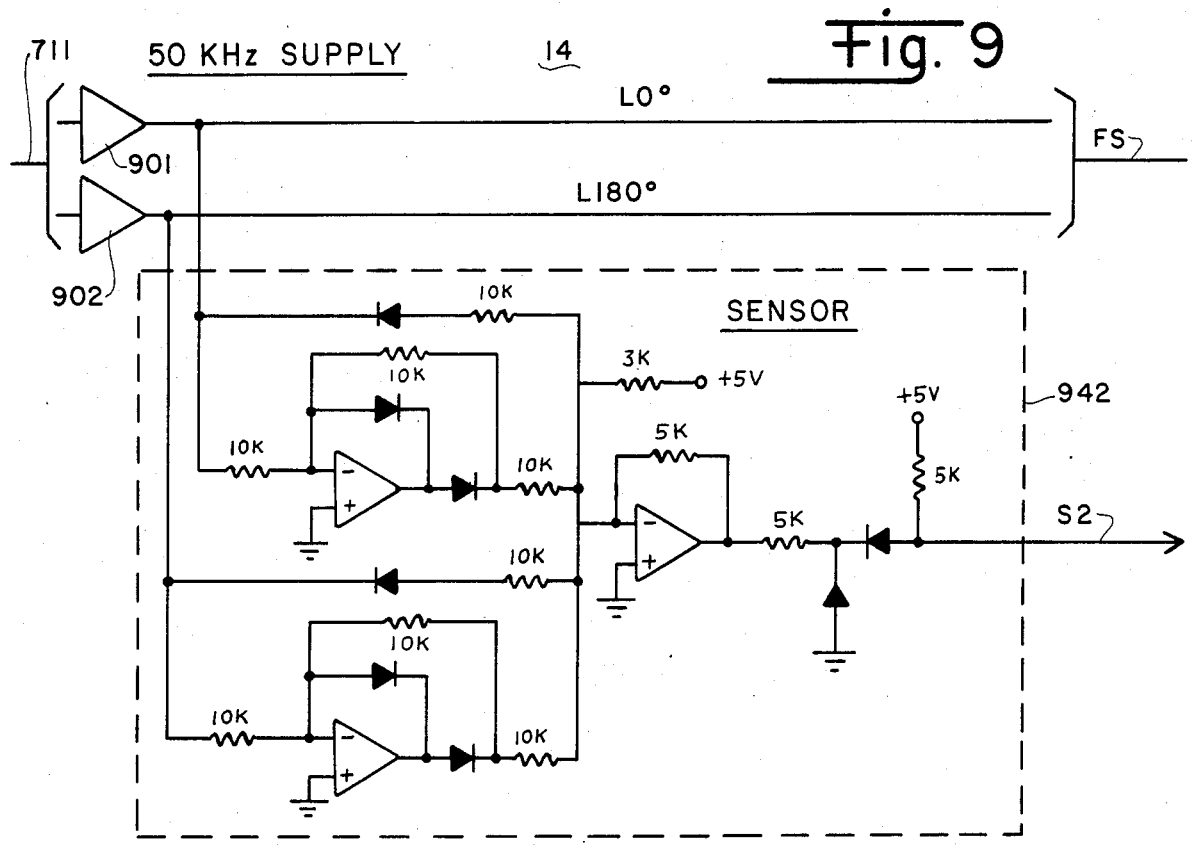
Fig. 9
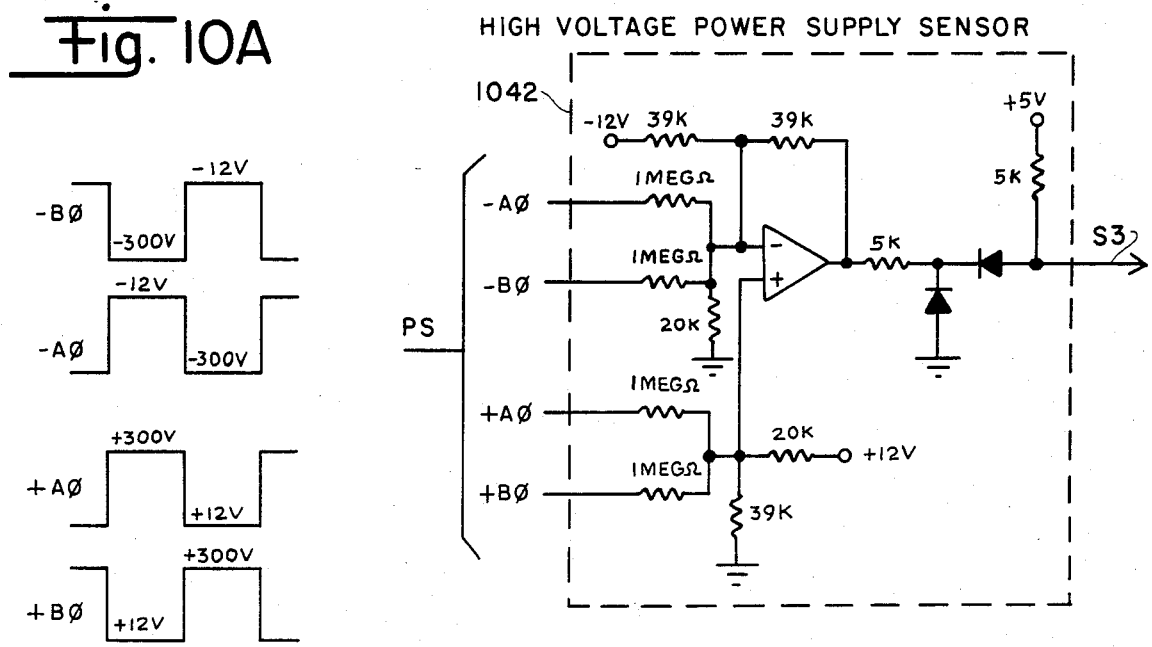
Fig. 10A
Fig. 10

TRANSIENT TEST OF SUSPENSION ELECTRONICS FOR GYROSCOPE

RIGHTS OF THE GOVERNMENT

The invention described herein may be manufactured and used by or for the Government of the United States for all governmental purposes without the payment of any royalty.

BACKGROUND OF THE INVENTION

This invention relates to a circuit for testing for transient abnormalities of the rotor suspension electronis of a gyroscope, and more particularly to system in which faults are isolated and recorded for later analysis.

An electrostatic gyroscope is a free rotor type of gyroscope in which the rotor support forces are derived from an electric field. The rotor is generally an aluminum or beryllium sphere which may be either solid or hollow. The electrostatic support consists generally of a plurality of pairs of spherical segment electrodes or plates dispersed about the rotor.

One development in electrostatic gyroscope suspension systems is the use of a mass unbalanced rotor, instead of induction pickoff schemes, to obtain attitude readout. See for example a paper entitled "Electrostatic Gyro Operation and Application" presented by Rockwell International at the Institute of Navigation Thirty-Fourth Annual meeting June 26-29, 1978, Arlington, Va. and two U.S. Pat. Nos. 3,697,143 and 3,955,426 to Klinchuch, assigned to Rockwell. The paper and two patents are incorporated by reference.

Attitude is the relative orientation of the spin axis of the rotor to, for example, the case housing of the rotor. Attitute readout can be obtained by detecting the amplitude of the modulation of the electrode voltages caused by the mass unbalance rotor as it spins around its spin axis. The plate voltgage modulation results from the pendulosity of the rotor, which causes the gap to change between the rotor and the plate electrodes as the rotor is spinning. The maximum plate modulation occurs in the plane of the rotating pendulosity vector. Thus, the pickoff signal consists of two signal components, a servo signal indicative of the linear displacement of the rotor and a mass unbalance modulation signal resulting from the pendulosity of the spinning rotor.

The Problem

The rotor suspension electronics of an electrstatic gyro is required to perform flawlessly to sustain the life of the gyro. Transient abnormalities as short as one millisecond duration will cause the spinning rotor to come in contact with the surrounding electrodes and result in destruction of the gyro. Thus, not infrequently after a catastrophic dropped rotor incident no trace of the fault is evident upon ensuing check of the system. Consequently, to avoid a repeat incident, the system operation is shutdown and a search, sometimes prolonged and painstaking, must be conducted to root out the transient source.

Thus, a demand for on the spot fault isolation was presented. Present technique employs tape recorders and digital conversion storage instruments to monitor suspension system test points. However, there are short comings to this method:

1. Requirement for a technical specialist to be on call to interpret the captured data.
2. Lack of equipment portability—this method is usable only in a laboratory environment.

Other Prior Art

Chombard in U.S. Pat. No. 3,807,238 discloses a fault warning device for gyroscope instruments. It gives a warning in response to a drop in rotor speed or loss of electrical power. A device by Shima et al in U.S. Pat. No. 4,255,978 monitors the torsional vibration occurring in a rotating shaft system. In U.S. Pat. No. 3,323,378, Powell shows in FIG. 4 a gyroscope connected to a computer: and Atkinson in U.S. Pat. No. 3,891,285 (assigned to Rockwell) discloses sensing circuitry for an electrostatic gyroscope.

SUMMARY OF THE INVENTION

An object of the invention is to provide means for on the spot fault isolation of the suspension electronics of a gyroscope, which does not require a technical specialist to be on call to interpret the captured data, and which can be used in the normal equipment environment.

This invention is directed to a built in test (BIT) system used to provide fault isolation in an electrostatic gyro suspension system. The test circuitry is built into the navigation system electronics and integrated with the system program. The fault isolation electronics comprise sensor circuits to monitor functional subdivisions of the electronic suspension system for signal abnormality and a processing circuit which receives the sensor circuit outputs and identifies the primary source of the fault. The faults are detected and the source is flagged at the time of occurance. The output of the fault isolation electronics is a latched coded readout which is fed to the navigation computer for memory storage and any appropriate follow-up system action, such as power shutdown. This readout is made available, also, to external monitoring equipment during ground operation.

Features of the invention include:
1. Fault detection for Electrostatic Gyro Suspension System is built into the navigation system electronics and integrated with the system program. Faults are detected, isolated to the module, and recorded into computer memory at the time of failure occurrence.
2. Standard integrated circuits and attendant resistor, capacitor circuitry are utilized.
3. After initialization by the computer, the fault isolation function is an automatic operation by the electronic circuitry.

BRIEF DESCRIPTION OF THE DRAWINGS

FIG. 9 is a functional block and schematic diagram of the 50-kilohertz power power supply of FIG. 1, showing how connections are made to a sensor circuit for fault detection;

FIG. 10 is a functional block and schematic diagram of the high voltage power power supply sensor circuit for fault detection;

FIG. 10A is a timing diagram for the high voltage power supply; and

DETAILED DESCRIPTION

The transient BIT (Built In Test) suspension electronics is designed as an integral part of the system electronics to perform the fault isolation task. Faults are detected and the source is flagged at the time of occurance. The output of the fault isolation electronics is a latched coded readout which is fed to the navigation computer for memory storage and any appropriate follow-up system action, such as power shutdown. The readout is made available, also, to external monitoring equipment during ground operation.

The fault isolation electronics is comprised of two basic sections:

1. Sensor circuits, to monitor functional subdivisions (modules) of the electronic suspension sytem for signal abnormality. Certain vectorial properties of this system are utilized to simplify the detection circuits.

2. Processing circuit which receives the sensor circuit outputs and identifies the primary source of the fault.

GYROSCOPE SYSTEM

Figure 1:
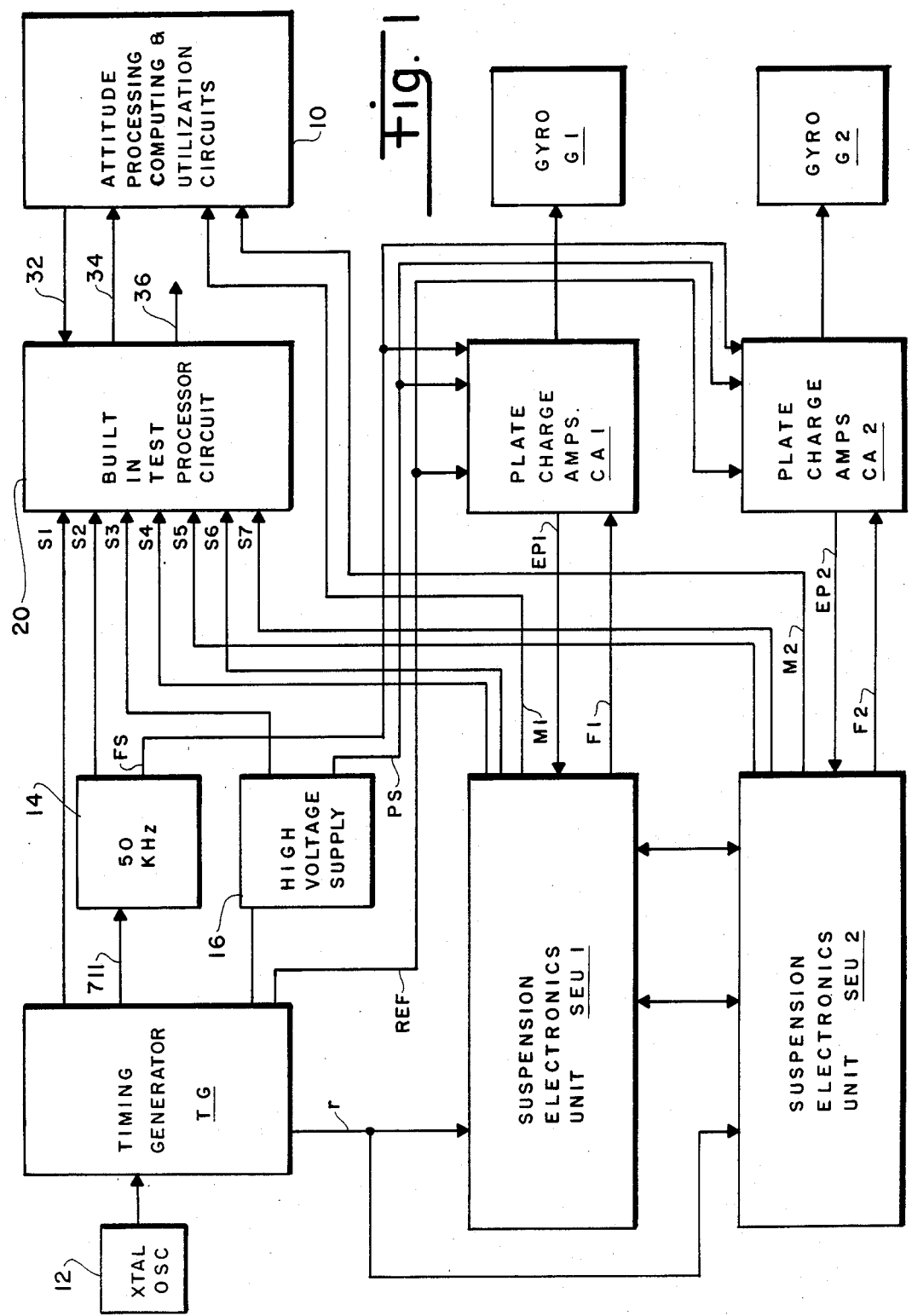
FIG. 1 is a block diagram of an electrostatic gyro suspension system having two gyroscopes.

Referring now to the drawings, FIG. 1 illustrates a simplified block diagram of an electrostatically supported gyroscope system, in a system which uses two gyroscopes G1 and G2. This diagram may represent the system shown in either of the Klinchuch U.S. Pat. Nos. 3,697,143 or 3,955,426, with the built in test of the suspension electronic equipment added thereto. Each electrostatic gyroscope comprises a conductive spherical ball or rotor (not shown) which spins about an axis and is electrostatically supported among pairs of plate electrodes (not shown), with each electrode of a pair being diametrically opposed to the other electrode in that pair. There are typically four pairs, or a total of eight electrodes for each gyroscope.

Charge signals from plate charge amplifiers CA1 are applied to the electrodes of the gyroscopes G1 to maintain the rotor in an essentially central position therebetween. The displacement of the rotor between each pair of electrodes is determined by measuring the electrode voltages when the charge signals are applied to the electrodes. To accomplish this, pickoff electronics are utilized to pick off a portion of each of the voltages applied to the elecrodes. The signals from the electrode pairs are supplied via a set of conductors shown as a line EP1 to a suspension electronics unit SEU1, which uses the displacement information to control the charge applied by the plate charge amplifiers CA1 for each pair of electrodes, with signals on a set of conductors shown as a line F1. By this means, the rotor is electrostatically suspended between the electrodes. In like manner, for the other gyroscope G2 there are plate charge amplifiers CA2 and a suspension electronics unit SEU2, coupled via lines EP2 and F2. The units SEU1 and SEU2 also derive attitude output signals suppled via lines M1 and M2 respectively to attitude processing, computing and utilization circuits 10.

To enable the attitude, or relative orientation of the spin axis of the rotor with respect to, for example, the case (not shown) housing the rotor, to be obtained, the rotor is given a pendulosity or mass unbalance by manufacturing it such that the center of mass is displaced from the center of geometry. When the rotor is at its proper speed, the spin axis of the rotor passes through the center of mass. This pendulosity, therefore, causes the gap to change between the rotor and the plate electrodes as the rotor is spinning. As a result, a mass unbalance modulation (MUM) signal is induced into the the plate voltages as the rotor spins around its axis. Thus, each pickoff signal consists of two components, the linear displacement of the rotor and the MUM signal resulting from the pendulosity of the rotating spherical rotor.

The system includes a timing generator TG controlled by a crystal oscillator 12. The timing generator supplies timing signals via a line r to the suspension electronics units SEU1 and SEU2, and via a line REF to the plate charge amplifiers CA1 and CA2. The timing generator also supplies an input to a 50-kiloherz power generator 14, which supplies input power via a line FS to floating power supplies of the plate charge amplifiers CA1 and CA2. There is also a high-voltage power supply 16 which supplies power via a line PS to the plate charge amplifiers CA1 and CA2.

The built in test (BIT) system according to the invention is used to provide on the spot fault isolation of the suspension electronics of the gyroscopes. The test circuitry is built into the navigation system electronics and integrated with the system program. The fault isolation electronics comprise sensor circuits to monitor functional subdivisions of the electronic suspension system for signal abnormality and a processing circuit 20 which receives the sensor circuit outputs and identifies the primary source of the fault. The sensor circuits are built into the suspension electronics units SEU1 and SEU2, and also into the timing generator TG, the 50-kilohertz supply 14, and the high-voltage supply 16, with outputs on lines S1–S7 to the processing circuit 20. The faults are detected and the source is flagged at the time of occurance. The output of the fault isolation electronics is a latched coded readout which is fed to the navigation computer of block 10 for memory storage and any appropriate follow-up system action, such as power shutdown.

The closed loop composition of the suspension servo system complicates the fault isolation task because a signal disruption originating in any part of the loop propagates and appears with very short time delays in other parts of the loop. More over, in the case of a transient originating in either the timing signal generator, high-voltage power supply or 50 KHZ reference supply modules the signal disruption can be reproduced with virtually undetectable time delay on all monitored waveforms in the system. Provision is made in the processor section of the fault isolation circuitry 20 to cope with this situation, which is described in more detail below.

SENSOR CIRCUIT DESCRIPTION

Figure 2:
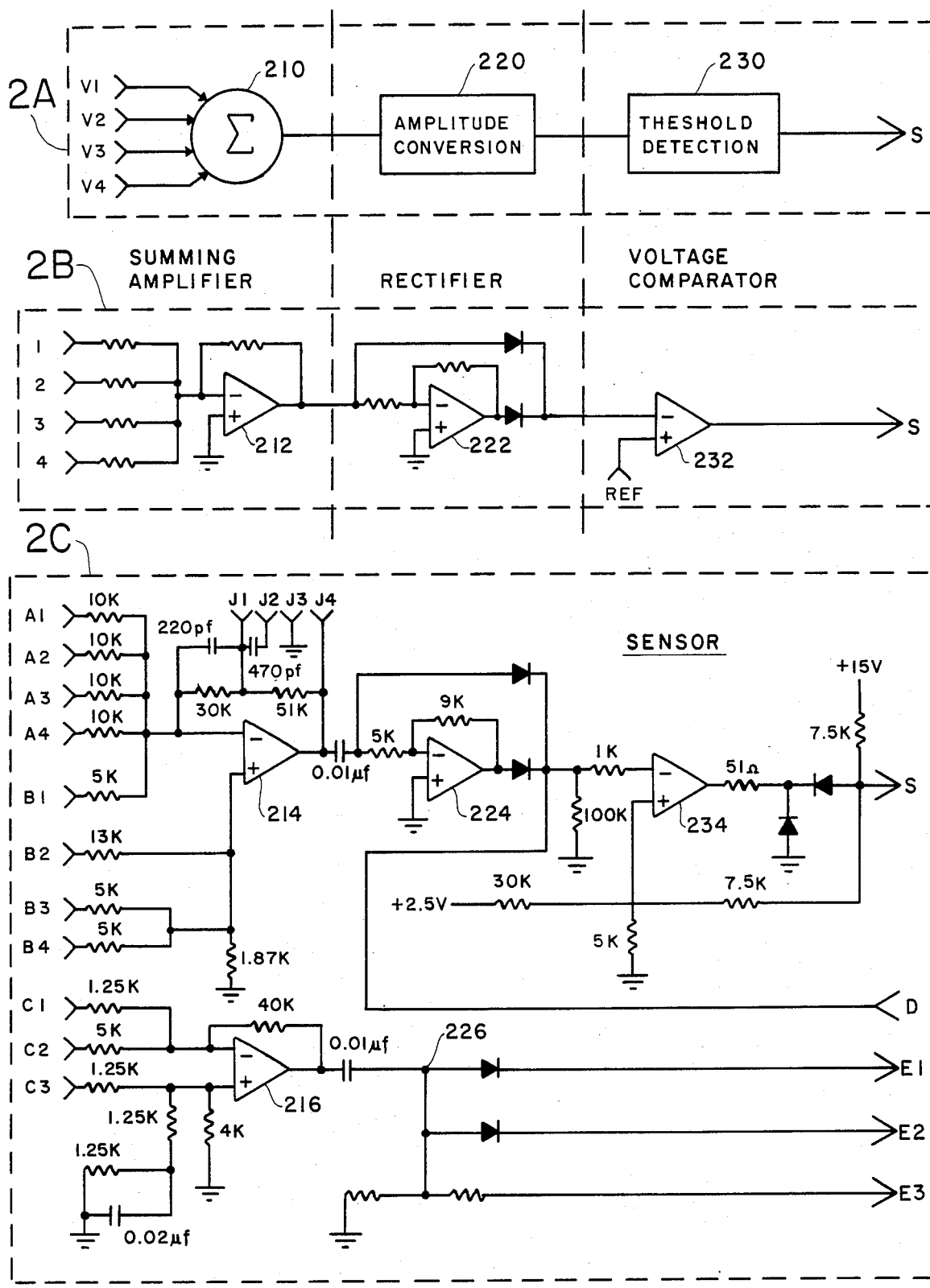
FIG. 2 comprises a block and schematic diagram of sensor circuits for fault detection in modules of an electrostatic gyro suspension system.

In FIG. 2 is shown a typical sensor circuit where simplification of the sensing function is illustrated by the summation operation of four monitored signals. The sensor is shown by a block diagram 2A as comprising a summing amplifier 210 with four inputs V1-V4, an amplitude conversion of rectifier stage 220, and a threshold detection or voltage comparator stage 230, with output at S.

Block 2B shows a simple form of the sensor as comprising three operational amplifiers 212, 222 and 232 for the three stages. The op amp 212 for the summing amplifier has four equal resistors from the four inputs to a minus input of the op amp, a ground connection to a plus input, and a resistor between the minus input and the output. The op amp 222 has a minus input coupled via a resistor to the output of op amp 212, a plus input connected to ground, its ouput connected to the anode of a diode, and a diode having its anode connected to the output of the op amp 212, the cathodes of the two diodes being connected together as the output of the stage. The op amp 232 has a minus input connected to the output of the rectifer stage, a plus input connected to ground, and its output connected to lead S.

Block 2C shows a schematic diagram of one form of a sensor circuit which has been used. Three op amps 214, 224 and 234 correspond to the op amps of block 2B. Four inputs A1-A4 of the summing amplifier via 10,000-ohm resistors correspond to the four inputs of block 2A or 2B. There are four additional inputs shown here as B1-B4. Input B1 is connected via a 5,000-ohm resistor, along with the inputs A1-A4 to the minus input of the op amp 214. Input B2 is connected via 13,000-ohm resistor, and inputs B3 and B4 are connected via 5,000-ohm resistors, to the plus input, which is also connected to ground via a 1,870-ohm resistor. The circuit between the input and output of the op amp 214 includes a 30,000-ohm resistor shunted by a 220-picofarad capacitor, which may be in series with a 51,000-ohm resistor shunted by a 470-picofarad capacitor, or alternatively the 51,000-ohm resistor may be shorted and the 470-picofarad capacitor connected to ground, as determined by jumpers at terminals J1-J4. A 0.01-microfarad capacitor couples the summing amplifier stage to the amplitude conversion stage, which is the same as shown in block 2B, the input resistor being 5,000 ohms, with an additional 9,000-ohm resistor between the minus input and the output of the op amp 224, and a 100,000-ohm resistor from the cathodes of the two diodes at the output to ground. The threshold detection stage has a 1,000-ohm resistor at the input to the minus terminal of the op amp 234. The output is via a 51,000-ohm resistor to the cathodes of two diodes, the anodes of the diodes being to ground and to the terminal S respectively. The terminal S is also connected via a 7,500-ohm resistor to plus 15 volts, and via a 7,500-ohm resistor to the plus input of the op amp 234, and thence via a 5,000-ohm resistor to ground. The reference source includes a connection from plus 2.5 volts via a 30,000-ohm resistor to the plus input of the op amp 234.

The sensor 2C includes an additional summing amplifier with an op amp 216. The four op amps of the sensor may comprise a quad op amp integrated circuit. Terminals designated C1 and C2 are connected respectively via a 2,250-ohm and a 5,000-ohm resistor to the minus input of the op amp 216. A plus input of the op amp is connected via a 1,250-ohm resistor to a terminal C3, via a 40,000-ohm resistor to ground, and also via a 1,250-ohm resistor in series with a 1,250-ohm resistor shunted by a 0.02-microfarad capacitor to ground. The minus input of the op amp 216 is connected to its output by a 40,000-ohm resistor, and the output is coupled via a 0.01 microfarad capacitor to a junction point 226. Point 226 is connected to the anodes of two diodes, whose cathodes are terminals designated E1 and E2. Point 226 is also connected via a 25,000-ohm resitor to a terminal E3, and via a 5,000-ohm resistor to ground. A terminal D provides an additional input to the threshold detection (voltage comparator) stage. As shown later, the C1-C3, D and E1-E3 terminals of several sensors may be interconnected.

In the case of the gyro electrode derived signals the sum of the four electrode pair signals are always equal to zero because of the spatial orientation of the electrode axis. Although these signals are complex quasi-square wave 10 khz signals with superimposed suppressed carrier modulated information, the sum of the four normal behaving signals is equal to zero. Hence, any deviation of the summed output from zero is an indication of a fault in one of the four constituents. For the exceptional case where all four channels drop out simultaneously, the probability is high that this failure mode will be detected and flagged by one of the other sensors monitoring the timing Signal Generator or one the power suplies. (More on this below).

Similar relationships which simplify sensing circuit design is utilized in most areas. Timing Signal Generator signals either have complimentary phases which sum to a constant DC value or are operated upon in the sensor circuitry to form a constant. High Voltage Power Supply and 50 khz Refernce Supply waveforms respectively are summed to form constant DC values. Failure in any of the signal components causes a deviation from the constant which is then simply detected by the voltage comparator circuit of the sensor.

PROCESSOR SECTION

Figure 3:
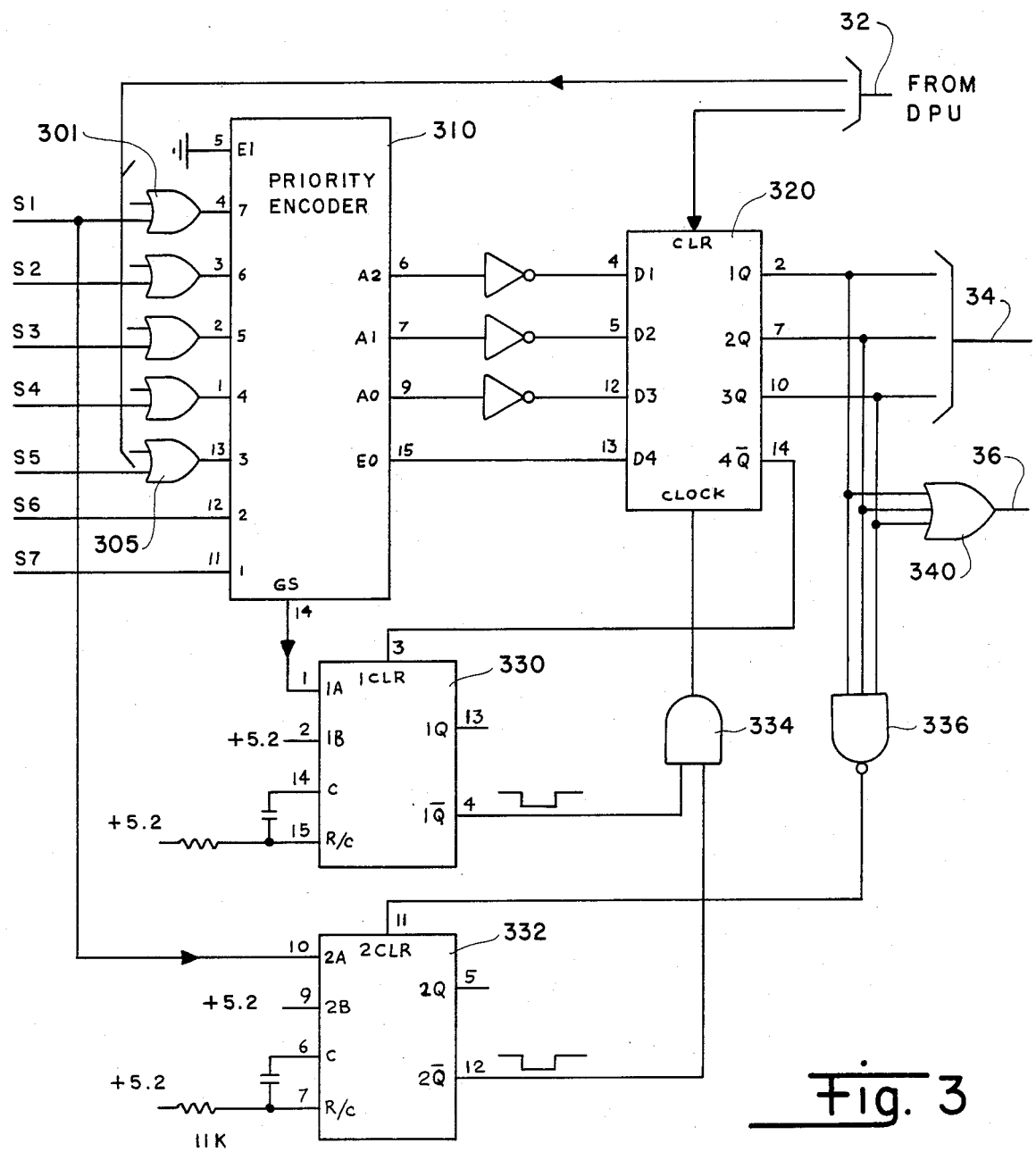
FIG. 3 is a functional block diagram of test processor circuit used with the sensors of FIG. 2.

In FIG. 3 is shown a diagram of the fault isolation electronics. The input on lines S1-S7 from the individual transient sensors which are utilized to monitor the various functional elements (modules) of the suspension system are shown on the left. The processor section which performs the fault source selection comprises a priority encoder 320 (IC type 54LS148), a latch device 320 (IC type 54LS175), and two one-shots 330 and 332 (a dual monostable timer IC type 54LS123). The three-bit encoded output on line 334 to the navigation computer is shown on the right. Five OR gates 301-305, which couple the sensor leads S1-S5 to the priority encoder 310, also provide for control discrete inputs from the DPU (data processing unit) via line 32, for test inhibit modes used in a suspension checkout mode before liftoff. Line 32 also includes a lead for a reset pulse from the DPU to the clear input of the data latch 320. An OR gate 340 having inputs from the three leads of line 34 provides an output on lead 36 to external instrumentation.

The priority encoder 310 is implemented in the circuit with the capability to select the primary fault source even when there is a log jam of multiple failure flags as a result of several sensors' responses to the catastrophic event, as in the situation cited earlier.

This is accomplished by a sequence algorithm which is embedded into the priority encoder by the order in which the individual sensing circuits are hard wired into its input terminals. This order is based on the module heirarchy pertaining to the suspension electronics signal flow as depicted in FIG. 1.

1. Timing Signal Generator
2. High Voltage Power Supply
3. 50 khz Reference Supply
4. Suspension Servo Module
5. Charge Amplifier Module When more then one sensor associated with the above modules flags a failure in the same time frame, the priority encoder, by its internal logic, selects the module which is listed highest on this list. For example; failure in the Timing Signal Generator will propagate an instantaneous disruption on all module outputs and failure flags will appear on all sensor outputs simultaneously, but the priority encoder in conformance to the embedded algorithm selects the Timing Signal Generator as the primary source since it is located at the top of the order per the list above.

Figure 4:
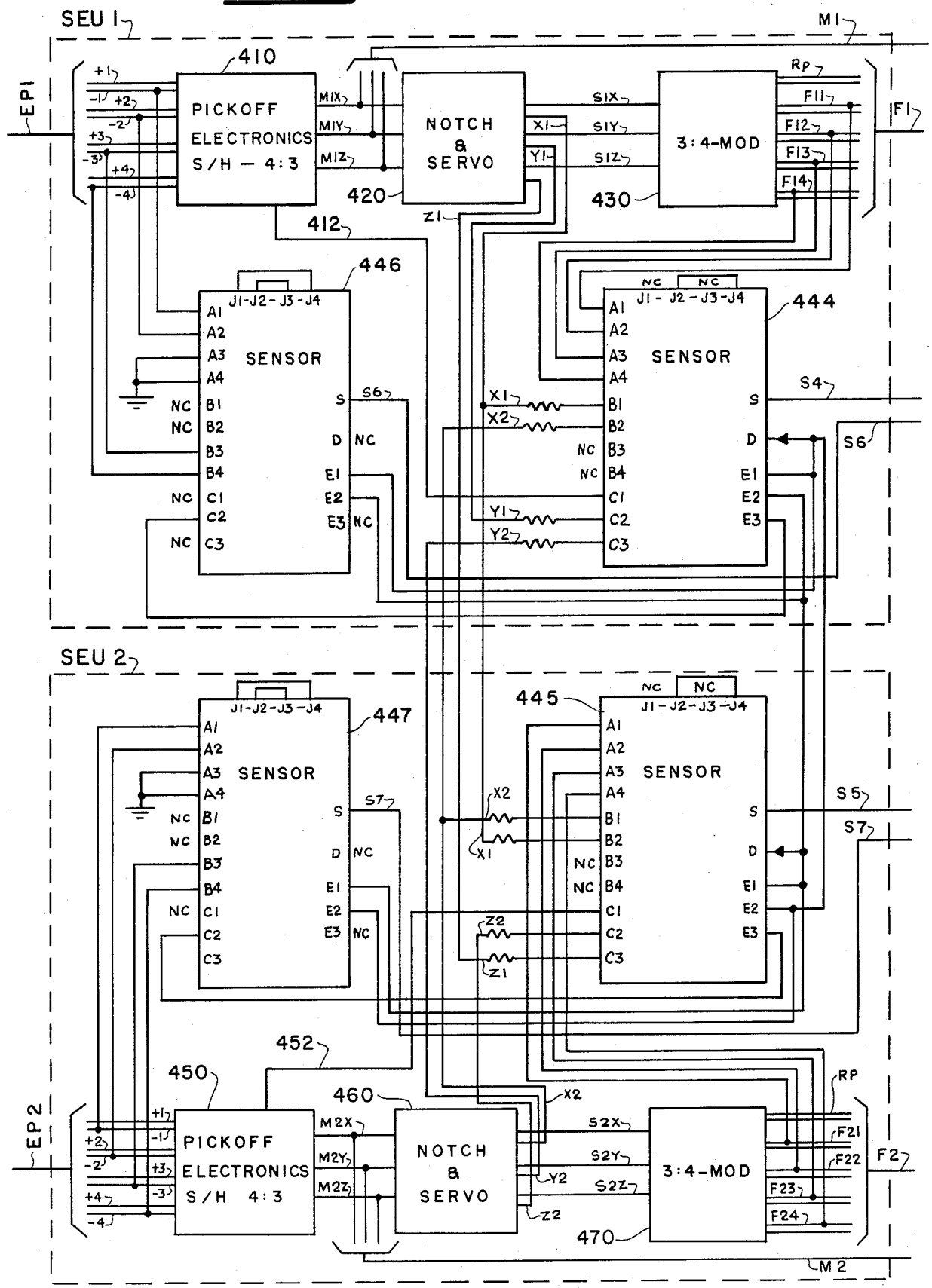
FIG. 4 is a block diagram of suspension electronics modules with sensors for the system of FIG. 1.

The Suspension Servo module is located higher in order than the Charge Amplifier module because a Charge Amplifier failure signal will not propagate to the output of the Suspension Servo module because of the characteristics associated with its internally implemented four-space to three-space (orthogonal coordinate system) vectorial conversion section as shown in FIG. 4. On the other hand, a failure in one of the outputs of the Suspension Servo module will propagate instantaneously to the Charge Amplifier output. Hence, the priority encoder will select correctly the Suspension Servo module as the originating failure source when both sensor circuits flag failures in the same time frame.

The priority encoder 310 uses low inputs and outputs as the active level. The enable input terminal EI is grounded, so that it is always low. With all of the inputs 1–7 high, the ouputs A0, A1 & A2 are all high. When any one of the inputs 1–7 is low, the highest priority input is encoded on the three outputs with low levels, e.g. a "1" is encoded as 011 and a "7" as 000 on leads A0, A1 & A2. Note that lead S1 from the timing generator sensor goes to the highest priority input 7, etc. There are additional output terminals GS and EO which are normally high and low respectively when all inputs 1–7 are high, with GS going low and EO going high when any input 1–7 goes low.

The priority encoder three-bit coded output is sent via inverters to the latch register 320, inputs D1, D2 & D3. Output EO is sent directly to input D4. Output GS of the encoder which indicates presence of a flagged failure by a level change is used to trigger the one-shot 330. The one-shot generates a pulse whose width establishes a time frame unit in the processor circuit.

The one shot pulse duration is set for 1.7 millisecond. The trailing edge of this pulse is used via an AND gate 334 to clock in the three bit data (as well as the signal from terminal EO) into the latching register. In this way, a delay of 1.7 milliseconds is provided between the intial failure recognition by the priority encoder and the acceptance of three-bit data by the latching register. This delay insures that very short noise transients are screened out since the transient must hold for at least 1.7 milliseconds to enable the priority encoder to hold the data for latch acceptance (at trailing edge of clock pulse). The inverted output of the fourth latch of device 320 is connected to the clear input of the timer 330, so that when this signal goes high it locks out subsequent triggers from the encoder 310.

The reset line from the computer allows the computer to clear the register at system initialization and, also, after a failure event has been written into the computer memory.

The second timer 332 has its trigger input connected to lead S1, so that when there is an active signal from the timing generator sensor, this timer will be triggered before timer 330. The trailing edge of its 1.7-millisecond pulse is also used via the gate 334 to clock the data into the register 320. A NAND gate 336 couples the three data outputs of the register 320 to the clear input of the timer 332, to lock out subsequent triggers.

The suspension electroncs units SEU1 and SEU2 are shown in more detail in FIG. 4, with the system as disclosed in Klinchuch U.S. Pat. No. 3,697,143, and the addition of the sensors according to the present invention. The unit SEU1 is shown with a block 410 for the pickoff electronics comprising differential amplifiers, sample & hold circuits, and a four-to-three transformation circuit. Block 420 represents a notch filter followed by a servo circuit, and block 430 represents a three-to-four transformation circuit and modulators for supplying signals to the charge plate amplifiers CA1 (FIG. 1). The transformation circuit in block 410 changes the four input signals into signals corresponding to the signals along orthogonal axes X, Y and Z respectively. The transformation converts four dependent pickoff signals to a set of three independent signals. This prevents saturation of the suspension electronics when pickoff offset voltages occur. For convenience the input circuits of block 410 and the output circuits of block 430 are referred to as four space, while the circuits of block 420 are referred to as three space. The unit SEU2 is represented by similar blocks at the bottom of FIG. 4.

The notch filter has two important functions. The first is to attenuate the MUM signal to the plate charge amplifiers, while the second is to provide speed control. The attenuation of the MUM signal is required to minimize the gain at the rotor speed. A high gain at the rotor speed would reduce the MUM signal to a very small amplitude, making it difficult to obtain attitude readout information. In addition, a high gain at the rotor spin frequency causes large forces which are synchronous with the rotor motion, producing high drift rates. The attitude readout signals are taken ahead of the notch filter on leads M1x, M1y and M1z. The data processor in block 10 of FIG. 1 extracts the MUM signal for use by the attitude readout circuits (or program).

The unit SEU1 includes sensors 444 and 446, while the unit SEU2 includes sensors 445 and 447. These sensors correspond to the circuit 2C shown in FIG.2.

The sensor 444 monitors the operation of the suspension electronics unit SEU1, with connections from the four output leads F11–F14 to the four sensor inputs A1–A4, so that a malfunction of that unit is indicated by an active low signal on lead S4. In like manner the sensor 445 monitors the operation of the unit SEU2, with its output on lead S5.

Although the sensor 446 is located in unit SEU1, it actually monitors the operation of the charge plate amplifiers CA1, as represented by the signals on line EP1. The minus leads of the four pairs are connected to the sensor, with leads −1 and −3 to the sensor inputs A1 and A2, leads −2 and −4 to sensor inputs B3 and B4, and sensor inputs A3 and A4 being grounded. A malfunction of the charge plate amplifiers detected by the sensor is indicated by an active low signal on lead S6. In like manner the sensor 447 monitors the operation of the charge plate amplifiers CA2, with its output on lead S7.

The minus lead coming off the four pairs of charge amplifiers each constitute the difference signal between an electrode plate pair. This difference operation is performed inside the charge amplifier modules. Hence, the minus lead signals are quasi-square waveforms containing gyro rotor displacement information, both linear and mass unbalance (MUM). The sum of these four signals is equal to zero, unless there is a failure in one of the four in which case the composite becomes the waveform complement of the missing or deformed signal. The sensing circuit amplifies and rectifies this signal. The converted signal is then voltage compared with the reference threshold level. If larger than the threshold, the signal triggers the comparator output to the low level state indicating a detected failure.

Figure 5:
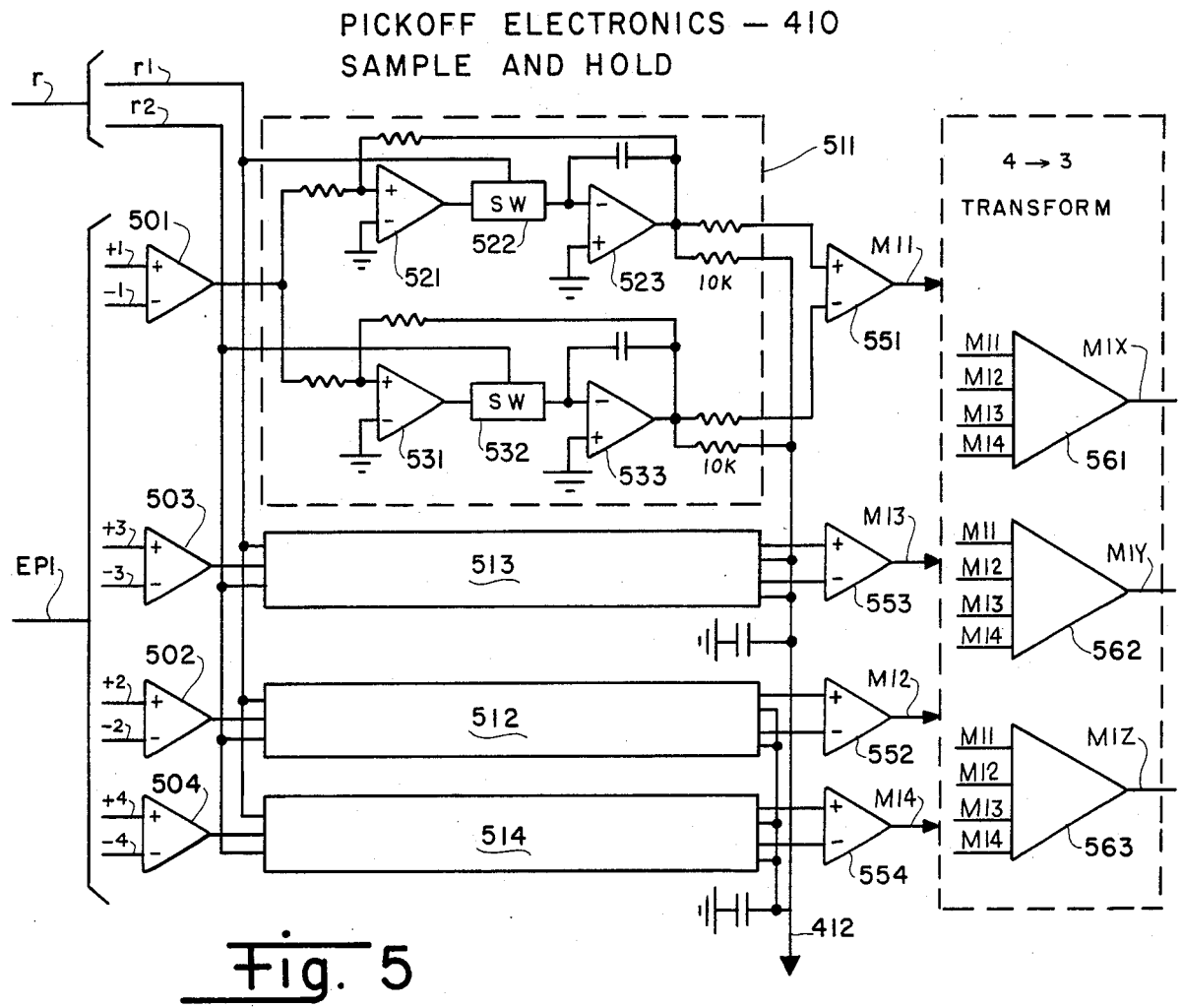
FIG. 5 is a functional block and schematic diagram of the pickoff electronics portion of a suspension electronics module showing how connections are made to sample and hold circuits for fault detection.
Figure 6:
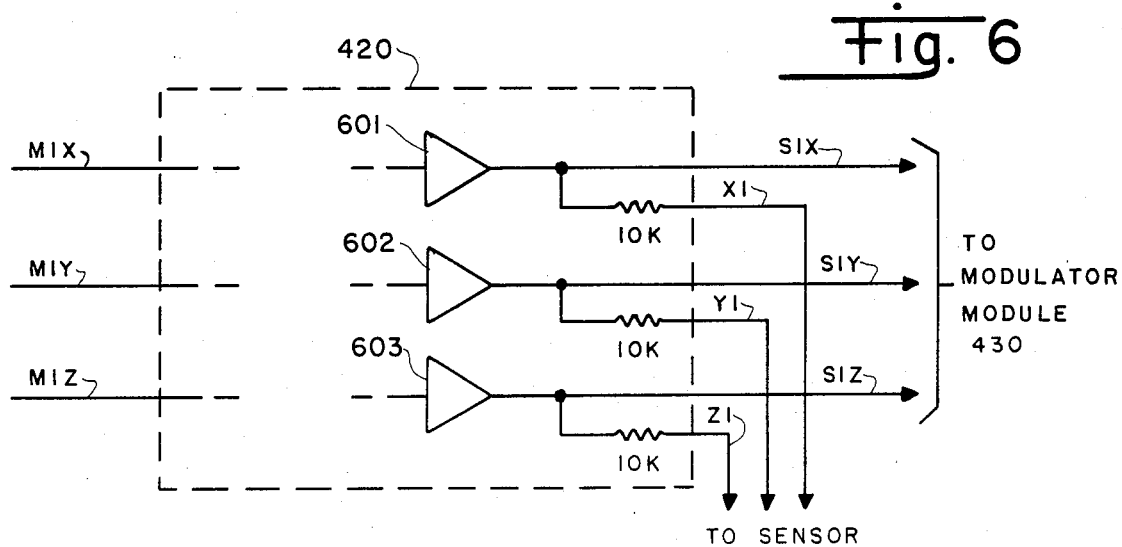
FIG. 6 is a schematic diagram of a portion of a suspension electronics module showing how connections are made to a servo circuit for fault detection.

The four sensors 444-447 have additional inputs to monitor internal operations of circuits of the suspension electronics units SEU1 and SEU2. Additional details of the unit SEU1 are shown in FIGS. 5 and 6, unit SEU2 being similar. FIG. 5 shows the pickoff electronics block 410. The four pairs of leads of line EP1 are connected respectively to inputs of four differential amplifiers 501-504. The outputs of the amplifiers are connected via sample and hold circuits to the inputs of four differential amplifiers 551-554. The output of the amplifier 501 goes to the inputs of two sample and holds circuits in block 511, whose outputs go respectively to plus and minus inputs of amplifier 551. Similarly each of the amplifiers 502-504 has connections to two sample and hold circuits, show as blocks 512, 513 and 514 which are the same as block 511, whose outputs are connected respectively to amplifiers 552-554. The first sample and hold circuit of each pair is controlled by timing signals on lead r1, and the second by timing signals on lead r2, which operate electronic switches coupled between operational amplifiers. The four-to-three transformation circuit comprises three operational amplifiers 561, 562 and 563, each of which has four inputs from the four amplifiers 551-554 as shown.

A lead 412 from the sample and hold circuits is connected to input C1 of sensor 444 (FIG. 4), and similarly a lead 452 from the sample and hold circuits of unit SEU2 is connected to input C1 of sensor 445.

Each of the 10,000-ohm resistors tap off the output of one of the sample and hold circuits as shown in FIG. 5. As shown in FIG. 5, two sample and hold circuits are used in each of the four pickoff channels. Hence, a total of eight resistors are used to monitor the sample and hold function. The sum of the eight signals via the resistors to the sensor circuit, again, as in the case of the charge amplifier signals, is equal to zero unless there is a failure.

In FIG. 4, the inputs B1, B2, C2 and C3 of sensors 444 and 445 are connected via 51,000-ohm resistors to test points of the servo circuits in blocks 420 and 460. The leads X1, Y1 and Z1 are connected in block 420 to sample the signals on lines S1x, S1y and S1z respectively; and the leads X2, Y2 nd Z2 are similarly connected in block 460 to sample the signals on lines S2x, S2y and S2z respectively.

FIG. 6 shows how the lead X1 is connected via a 10,000-ohm resistor to sample the signal on lead S1x. Only the output amplifiers 601, 602 and 603 of the servo network are shown. The servo network operates near a null, somewhere in the millivolts range, dc, plus the ac gyro speed component (approximately 2460 hz) which is less than 0.5 volt peak to peak.

The connections to the sensor are made such that the sensor compares corresponding axes of the two gyros, i.e., $X_1$ vs $X_2$, $Y_1$ vs $Y_2$, and $Z_1$ vs $Z_2$. Since the two gyros are sensing the same platform motions, the difference signal between the pairs should be very small. A nominal difference (1 volt) indicates failure in one of the gyros. (Positive identification as to which gyro is not made here.)

In FIG. 4, the leads X1 and X2 are coupled to the inputs B1 and B2 of the main summing amplifier of sensor 444, and the leads 412, Y1 and Y2 are coupled to inputs C1, C2 and C3 to the second summing amplifier. Output E3 of sensor 444 is connected to input C2 of sensor 446, and via the second summing amplifier therein provides outputs to E1 and E2. The leads X1 and X2 are coupled to the inputs B2 and B1 of the main summing amplifier of sensor 445, and the leads 452, Z2 and Z1 are coupled to inputs C1, C2 and C3 to the second summing amplifier. Output E3 of sensor 445 is connected to input C2 of sensor 447, and via the second summing amplifier therein provides outputs to E1 and E2. The outputs E1 of sensors 444 and 446, and outputs E2 of sensors 445 and 447, are connected together to input D of sensor 444, and thus effects the output on lead S4. The outputs E2 of sensors 444 and 446, and outputs E1 of sensors 445 and 447, are connected together to input D of sensor 445, and thus effects the output on lead S5. Thus the signals on leads S4 and S5 may indicate the condition of the two suspension electronics units SEU1 and SEU2 in three space.

Figure 7:
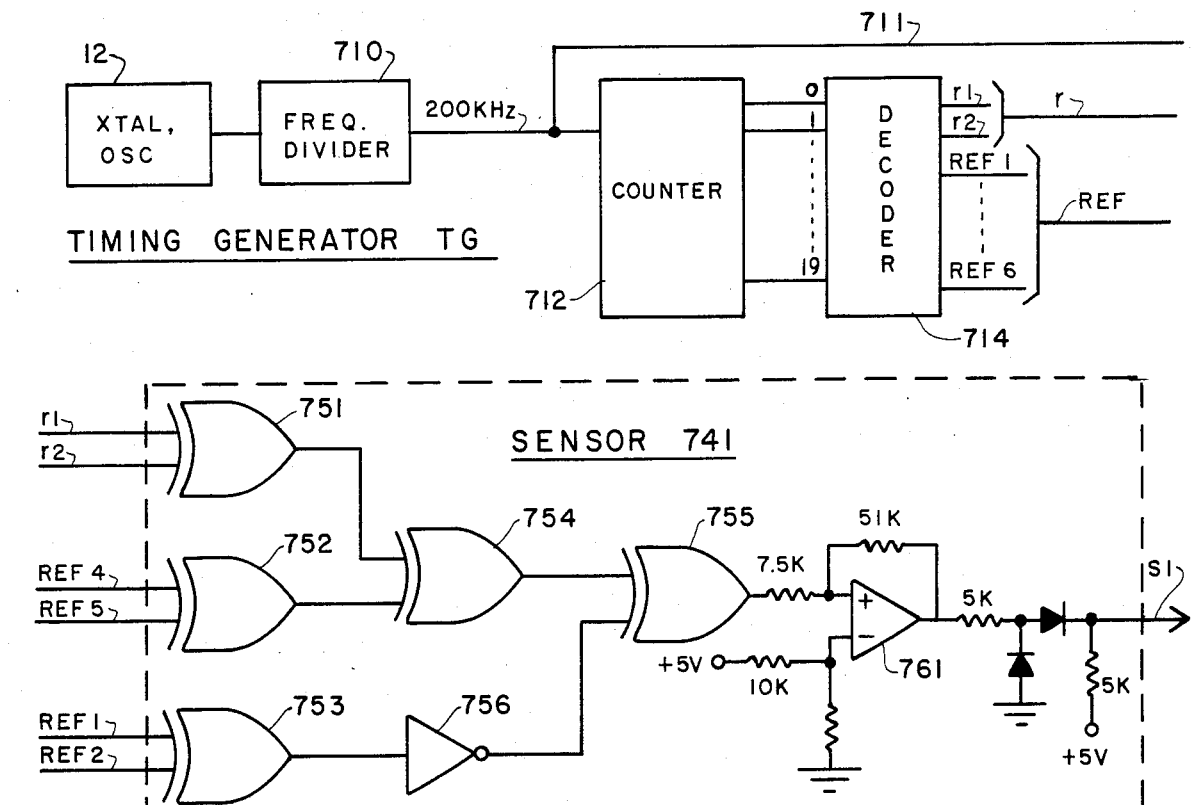
FIG. 7 is a functional block and schematic diagram of the timing generator of FIG. 1, showing how connections are made to a sensor circuit for fault detection.

A block diagram of the timing generator TG is shown in FIG 7. A frequency divider 710 has an input from the crystal oscillator 12 and an a 200 kilohertz output on line 711 to a counter 712. The counter 712 counts from 0 to 19 and then resets to zero repetitivly. The counts are decoded by a device 714 to provide signals on leads r1, r2 and REF1-REF6 as shown in FIG. 8.

The timing generator includes a sensor 741, comprising exclusive-of gates 751-755, a logic inverter 756, and an operational amplifier 761 with a resistor-diode network. From the timing generator, leads r1 and r2 are inputs to gate 751, leads REF4 and REF5 are inputs to gate 752, and leads REF1 and REF2 are inputs to gate 753. The outputs of gates 752 and 752 are inputs of gate 754, whose output is an input of gate 755. The output of gate 753 is coupled via the inverter 756 to another input of gate 755. The output of gate 755 is coupled via a resistor to an input of the op amp 761. The output of the op amp 761 is coupled via the resistor-diode netword to lead S1.

Figure 8:
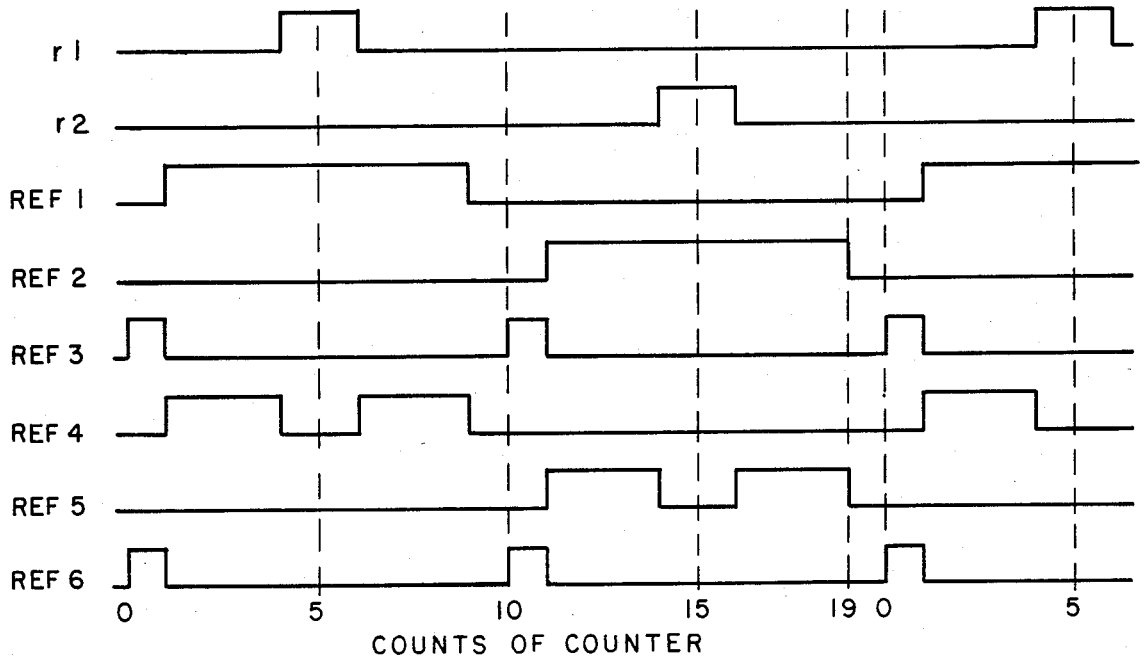
FIG. 8 is a timing diagram for the outputs of the timing generator.

The output signals of the Timing Generator (FIG. 7) are shown in FIG. 8. By the combination logic gates 751-756 shown in FIG. 7, a summation entity of these signals is synthesized to form a constant. Hence, any signal drop-out or deformation would cause the comparator to trigger a low output, indicating a failure detection.

FIG. 9 shows a portion of the 50-kilohertz power supply 14 and its sensor 942.

The 50 Khz power supply has two ac square wave outputs from amplifiers 901 and 902, one of the two is 180° phase with respect to the other. In the sensor circuit 942, each of the two outputs are full wave rectified, and then both are summed with a complement dc reference to yield a normal high output state (All diodes are type 1N914). If either 50 Khz signal drops out, the sensor drops to a low logic level indicating failure detection.

FIG. 10 shows the sensor 1042 of the high voltage power supply 16. Waveforms of the high voltage power supply outputs are shown in FIG. 10A. They are not actually dc outputs but ac square waves (10 khz) with offsetting dc voltages. Amplitude values for each segment of the waveforms are shown. The four phases are summed as shown, the positive phases connected to the positive input of the summing amplifier and the negative phases to the inverting input. Drop-out of any phase causes the output of the summing amplifier to go negative. The output diodes clamp the sensor output on lead S3 to a logic low level indicating failure detection.

Figure 11:
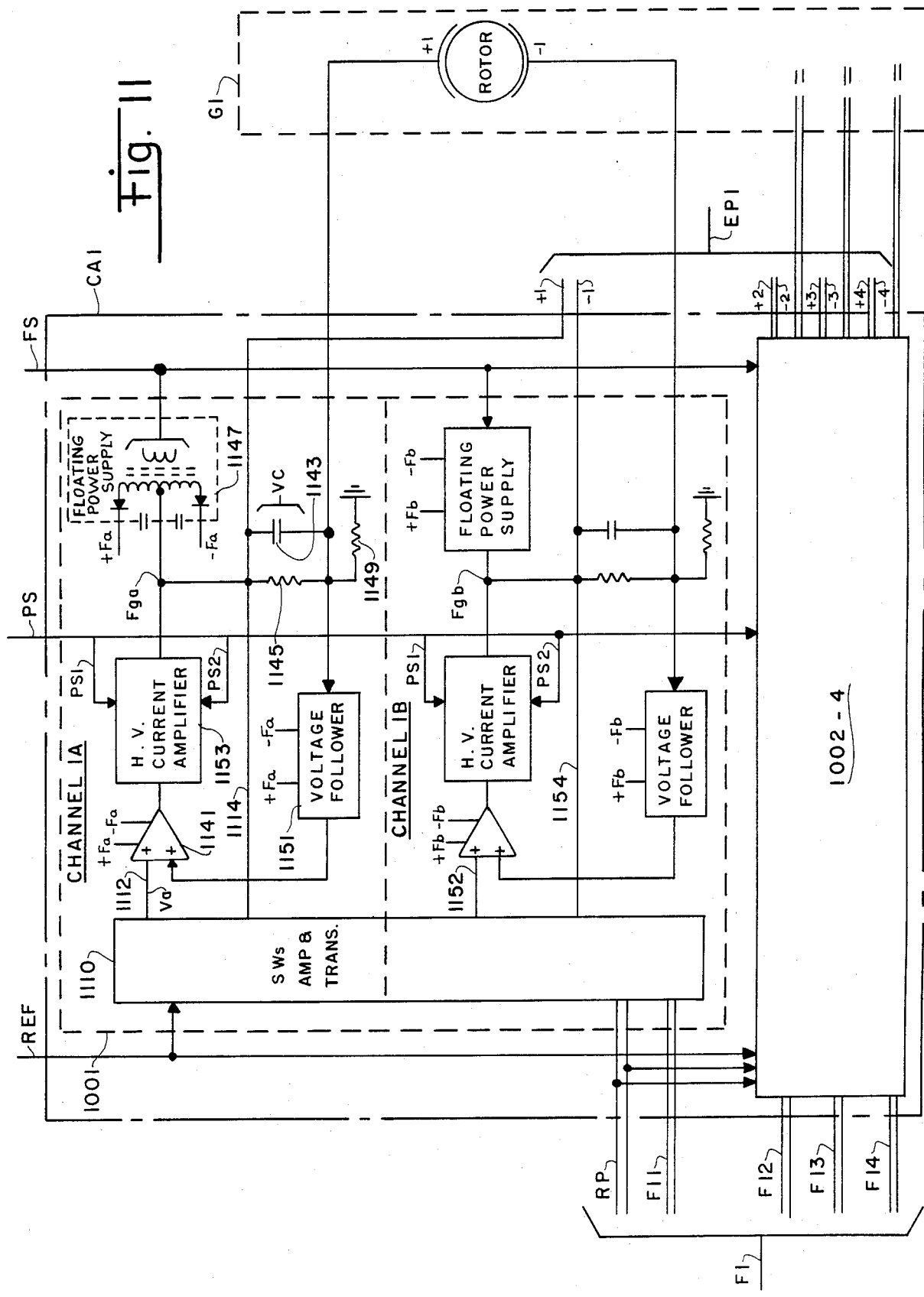
FIG. 11 is a functional block and schematic diagram of a plate charge amplifier of FIG. 1.

FIG. 11 shows a portion of the charge plate amplifiers CA1. The circuit is shown in both of the Klinchuch U.S. Pat. Nos. 3,697,143 and 3,955,426. The circuit in dotted line 1001 shows charge plate amplifiers comprising channels 1A and 1B for one pair of electrodes +1, −1 of the gyroscope G1. Similar charge plate amplifiers for the other three pairs of electrodes are represented by the block 1002-4.

The block 1110 represents switches, amplifiers and coupling transformers. The switches are enabled by timing signals from line REF, which go to all eight channels with similar operation. From block 1110, the secondary of one transformer is connected to leads 1112 and 1114 of channel 1A, and the secondary of another transformer is connected to leads 1152 and 1154 of channel 1B. In channel 1A, lead 1112 is one input of an amplifier 1149. Lead 1114 is connected to the junction of one end of a parallel-coupled capacitor 1143 and resistor 1145 and the input (floating ground Fga) to a floating power supply 1147. The other end of the parallel-coupled capacitor 1143 and resistor 1145 combination is coupled through a resistor 1149 to ground, to the +1 electrode of the gyroscope G1 and also through a very high input impedance voltage follower 1151 to the second input of the amplifier 1141. The input to the amplifier 1141 at lead 1112 is a voltage Va with respect to the floating ground Fga. In response to the voltage Va, the amplifier 1141 causes a high voltage amplifier 1153 to drive a current through the capacitor 1143 until the voltage Vc across the capacitor equals Va. Since the voltage follower 1151 is a very high input impedance amplifier, substantially all of the current passing through the capacitor 1143 is applied to the +1 electrode, except for a small leakage current through resistor 1149. Thus the amplifier 1141 serves to control the charge or voltage applied to the +1 electrode, since the charge on that electrode is equal to the charge on the capacitor 1143.

The floating power supply 1147 furnishes power to the voltage follower 1151 and amplifier 1141. This allows the use of lower power, low voltage, high bandwidth integrated circuits. The ground reference for these devices is Fga, which follows the +1 electrode potential. The floating power supply is simply a transformer having a secondary winding with its ends coupled through diodes to the leads +Fa and −Fa, with a center tap to point Fga. The combination of the wave shape (square wave) of the 50-kilohertz power applied from line FS to the primary and the design of the transformer provides a square wave output, so that little or no filtering is required.

No charge is applied to the +1 and −1 electrodes during each of the 0 and 10 counts of the timing generator TG. This is to allow the high voltage power supply 16 (FIG. 1) which drives the high voltage current amplifier 1153 and the corresponding amplifiers in the other seven channels to change state. When electrode +1 has only a positive polarity of the Rp signal applied thereto, the high voltage supply 16 has +300 volts DC applied to PS1 and −12 volts DC applied to PS2. When the + electrode has a negative polarity of the Rp signal applied thereto, the high voltage supply has +12 volts DC applied to PS1 and −300 volts DC applied to PS2. Switching the high voltage supply in this manner reduces the sustaining voltage requirements for the transistors used in the high voltage current amplifiers.

The amplitudes and polarities of the electrode pair I voltages developed during counts 4 and 5 and during counts 14 and 15 (Rp and −Rp voltages only), are in phase with those developed for electrode pair III and are 180° out of phase with those developed for electrode pairs II and IV.

It is understood that certain modifications to the invention as described may be made, as might occur to one with skill in the field of the invention, within the scope of the appended claims. Therefore, all embodiments contemplentated hereunder which achieve the objects of the present invention have not been shown in complete detail. Other embodiments may be developed without departing from the scope of the appended claims.

What is claimed is:

1. A test system used to provide fault isolation in a navigation system which includes an electrostatic gyroscope suspension system, with test circuitry built into the navigation system electronics and integrated with the system program, wherein said test system comprises:

a plurality of sensor circuits which have means for monitoring functional electronic subdivisions of the suspension system for signal abnormality, each sensor circuit having inputs from a plurality of points of one functional electronic subdivision and means operating on the signals appearing at its inputs so as to combine the values of the signals to form a constant D.C. analog value when the suspension system is operating normally, each sensor circuit having an output for indicating either a normal condition in response to said constant value or otherwise an abnormal condition of the subdivision it is connected to monitor;

a processing circuit which has inputs connected to receive the sensor circuit outputs, means to identify the primary source of the fault, using a predetermined priority of said sensor circuits in case of a plurality of faults occurring within a given time frame, and means for supplying an identification of the subdivision which is the source of the fault to a computer in the navigation system for memory storage and any appropriate follow-up system action.

2. A test system according to claim 1, wherein in the processing circuit said means to identify the primary source of the fault comprises a priority encoder device having inputs to which the sensor circuit outputs are connected, said device having a set of encoding outputs with a code for normal in response to all of the sensor circuits indicating a normal condition, and a code identifying the one of the sensor circuits indicating an abnormal condition which has the highest priority in response to one or more sensor circuits indicating an abnormal condition.

3. A test system according to claim 2, wherein the processing circuit further includes latching storage means having inputs coupled to said set of encoding outputs, a one-shot timer having a trigger input and an output, means coupling the priority encoder device to said trigger input for triggering the one-shot timer in response to a change from all sensors indicating a normal condition to at least one sensor indicating an abnormal condition to cause the one-shot timer to generate a pulse at its output having a predetermined duration, said latching storage means having a clock input coupled to the one-shot timer output to latch in response to the trailing edge of said pulse, whereby abnormal indications due to transients having a duration less than the pulse duration do not cause a code for an abnormal condition to be stored.

4. A test system according to claim 3, wherein some of said sensor circuits comprise a summing amplifier, amplitude conversion means, and threshold detection means coupled in tandem between the inputs and the output thereof.

5. A test system according to claim 4, wherein the summing amplifier, amplitude conversion means, and threshold detection means each includes a differential operational amplifier, the threshold detection means being a voltage comparator.

6. A test system according to claim 5, wherein said functional electronic subdivisions are modules of the electrostatic gyroscope suspension system, including a suspension electronics module and a charge amplifier module connected in a closed loop, with outputs from the charge amplifier module to electrodes of the gyroscope and to inputs of the suspension electronics module, outputs from the suspension electronics module to the charge amplifier module, and a timing generator module, there being a sensor circuit for each of said modules, each having inputs from outputs of its associated module, the sensor for the timing generator module having its output connected to the priority encoder device for the highest priority, with the sensor for the suspension electronics module connected for a lower priority, and the sensor for the charge amplifier module connected for a still lower priority.

7. A test system according to claim 6, further including an AC power supply of a given frequency for suppling power to floating power supplies within the charge amplifier module, and a high voltage power supply for supplying power to current amplifiers within the charge amplifier module, each of the power supplies having a sensor circuit, the outputs of which are connected to the priority encoder device with priority lower than the sensor circuit for the timing generator module but higher than the sensor circuit for the suspension electronics module.

8. A test system according to claim 7, wherein the navigation system includes two electrostatic gyroscopes, each having its own suspension system, each gyroscope having four pairs of suspension electrodes, the suspension electroncs module of each suspension system having means transforming the signals from the four pairs to independent signals for three coordinates, with the sensors for the suspension electronics modules for the two suspension systems having additional inputs and an additional summing amplifier, with interconnections between the two sensors for the suspension electronics modules to combine the signals so that the output of each sensor indicates a normal condition when both have inputs resulting from normal operation, and can detect certain abnormal operating conditions.

9. A test system used to provide fault isolation in a navigation system which includes an electrostatic gyroscope suspension system, with test circuitry built into the navigation system electronics and integrated with the system program, wherein said test system comprises:

a plurality of sensor circuits which have means for monitoring functional electronic subdivisions of the suspension system for signal abnormality, each sensor circuit having inputs from a plurality of points of one functional electronic subdivision and means operating on the signals appearing at its inputs so as to combine the values of the signals to form a constant D.C. analog value when the suspension system is operating normally, each sensor circuit having an output for indicating either a normal condition in response to said constant value or otherwise an abnormal condition of the subdivision it is connected to monitor;

a processing circuit which has inputs connected to receive the sensor circuit outputs, means to identify the primary source of the fault, and means for supplying an identification of the subdivision which is the source of the fault to a computer in the navigation system for memory storage and any appropriate follow-up system action;

wherein the navigation system includes a gyroscope which has four pairs of suspension electrodes, said functional electronic subdivisions are modules of the electrostatic gyroscope suspension system, including a suspension electronics module and a charge amplifier module connected in a closed loop, with outputs in the form of four pairs from the charge amplifier module to electrodes of the gyroscope and to inputs of the suspension electronics module, and outputs in the form of four pairs from the suspension electronics module to the charge amplifier module, there being a sensor circuit for each of said modules, each having inputs from outputs of its associated module;

the connections to inputs of the sensor circuit for each module comprising a connection from one lead of each pair at the output of the module, said means for operating on the signals including means for summing the signals on the four leads with said constant value being zero during normal operation.

10. A test system according to claim 9, wherein the sensor circuits for the suspension electronics module and the charge amplifier module include means for summing comprising a differential operational amplifier, which in the sensor circuit for the suspension electronics module has four equal resistors between inputs of the sensor circuit and an input of one polarity at the differential operational amplifier, which has an input of the opposite polarity coupled to ground potential.

11. A test system according to claim 10 wherein in the sensor circuit for the charge amplifier module, the means for summing has four equal resistors connected to an input of one polarity at a differential operational amplifier, with two of the resistors connected to leads of first and third pairs of the input to the suspension electronics module, with the other two resistors from said input of one polarity being connected to ground potential, the differential operational amplifier having an input of the opposite polarity coupled to ground potential, and also via two equal resistors to leads of second and fourth pairs at the input of the suspension electronics module.

12. A test system according to claim 9, wherein in the processing circuit said said means to identify the primary source of the fault comprises a priority encoder device having inputs to which the sensor circuit outputs are connected, said device having a set of encoding outputs with a code for normal in response to all of the sensor circuits indicating a normal condition, and a code identifying the one of the sensor circuits indicating an abnormal condition which has the highest priority in response to one or more sensor circuits indicating an abnormal condition.

13. A test system according to claim 12, wherein the electrostatic gyroscope suspension system further includes a timing generator module having a sensor circuit comprising combinational logic circuits with inputs from outputs of the module, and an operational amplifier coupled between the combinational logic circuits and the output of the sensor circuit, the sensor circuit for the timing generator module having its output connected to the priority encoder device for the highest priority, with the sensor circuit for the suspension electronics module connected for a lower priority, and the sensor circuit for the charge amplifier module connected for a still lower priority.

14. A test system according to claim 13, further including an AC power supply of a given frequency for supplying power to floating power suppplies within the charge amplifier module, and a high voltage power supply for supplying power to current amplifiers within the charge amplifier module, each of the power supplies having a sensor circuit, the outputs of which are connected to the priority encoder device with priority lower than the sensor circuit for the timing generator module but higher than the sensor circuit for the suspension electronics module.

* * * * *